Patented Jan. 5, 1937

2,066,421

UNITED STATES PATENT OFFICE 2,066,421

LAMINATED SHEET

Kurt Ripper, Berlin-Lichterfelde, Germany

No Drawing. Original application March 5, 1931, Serial No. 520,478. Divided and this application September 17, 1932, Serial No. 633,685. In Austria December 15, 1930

6 Claims. (Cl. 154—2)

My invention relates to laminated sheets or plates of material bonded together in its final hardened condition, by condensation products of thiourea or mixtures of thiourea and urea, with formaldehyde. This application is a division of my pending application for a process of making the said condensation products, Serial No. 520,478, filed March 5, 1931, and for a moldable composition containing the said product.

The object of the present invention primarily is to enable laminated bodies (particularly of paper, tissue or asbestos) of beautiful aspect and showing excellent mechanical and electrical properties, to be produced.

The process of making the above mentioned condensation products which are exceedingly well suited for being used as agglutinant or impregnating agent in manufacturing laminated sheets, consists essentially in reacting without applying heat with less than 2 mols, preferably 1½ mols, of formaldehyde upon 1 mol. of thiourea or of a mixture of thiourea and urea at a higher hydrogen ion concentration than corresponds to the value pH=5, consequently at a pH greater than equivalent to 5. Preferably the hydrogen ion concentration is adjusted so as to correspond to the value pH=3. Hydrogen-ion concentration is also sometimes expressed as $C_H$, using numbers with minus exponents to indicate the actual concentration of hydrogen ions in the solution or aqueous medium. The relationship between $C_H$ and pH is as follows:

$$pH = \log_{10} 1/C_H$$

Hence $C_H = 10^{-5}$ is expressive of the same hydrogen-ion concentration as pH=5; and $C_H = 10^{-3}$ is equivalent to pH=3.

By reacting in the cold with formaldehyde upon urea at a hydrogen-ion concentration greater than equal to pH 5, a white insoluble product serving no useful purpose is generated (cf. e. g. Beilstein-Prager-Jacobson, "Handbuch der Organischen Chemie", 3rd edition 1921, Tome IV. page 48). Thus for instance a solution of 60 parts by weight (1 mol.) of urea in 150 parts by weight of an aqueous formaldehyde solution containing 30% by weight (1½ mols) of formaldehyde, which by the addition of phosphoric acid had been brought to a hydrogen ion concentration corresponding to a pH of about 3, will pass at room temperature (about 20° C.) within a few minutes into a white crumbly cake unfit for anything. But the reaction will turn out quite differently, if the urea is without any other modification of the operating conditions entirely or partly replaced by thiourea. If, for instance in the above specified starting mixture half of the 60 parts by weight of the urea, that is 30 parts by weight or ½ mol., is replaced by 38 parts by weight (½ mol.) of thiourea, at the temperature of 20° C. a solution results, which remains clear as water for hours and with an addition of organic solvents such as for instance ethyl alcohol, will not show the least turbidity even after having stood at rest for 24 hours.

As is well known, the course of the condensation of urea with formaldehyde when carefully operating in a neutral or alkaline solution can be interrupted at a stage, in which the simple chemical compounds methylol urea and dimethylol urea (or mixtures of these compounds) are formed, which do not yet show any tendency to polymerization, but are capable of further condensation. Now I have succeeded in breaking the continuity of the reaction in the condensation of thiourea (or mixtures of thiourea and urea) with formaldehyde, by operating in an acid solution without heating. By this way of proceeding first of all true solutions of simple chemical compounds are produced, whereas the reaction between urea and formaldehyde, as has been mentioned above, will under the same conditions proceed without interruption up to the formation of useless insoluble masses. In the acid solution of the firstly generated simple thiourea (or thiourea and urea) formaldehyde condensation products the formation of complex compounds capable of polymerization and a slowly progressing polymerization will take place, during which the condensation products are, by growing of the molecules, successively transformed into the colloidal state. These reaction products can therefore, by systematically conducting the reaction, be brought into a state of polymerization which is adjusted to convenience, that is to say lower or higher, but in any case uniform. In addition thereto the colloids finally formed by this process are hydrophobe, so that they will give off the water easily and completely.

By other workers the interaction of thiourea and formaldehyde, when effected in an acid medium and without applying heat, has been found to yield a crystalline condensation product of the composition $C_3H_4N_2S$ which is said to be insoluble in all solvents and to be decomposed, with browning and effervescence, at about 202–203°. This compound is a dimethylene-thiocarbamide which does not have the character of artificial resins and does not pass over into such resins when being heated, but on the contrary is decomposed by heat with or without the action of pressure, and therefore cannot be used for the production of artificial masses. It was learned from experimental work that the reaction takes this turn when the hydrogen ion concentration exceeds a certain limit, but this limit depends also on the proportion of thiourea present when the starting material is a mixture of urea and thiourea, and on the temperature. Consequently only the rule may be given concerning the hydrogen ion concentration fit for the present process, that the condensation has to be effected at a pH less than 5, and that there is an upper limit giving rise to the generation of the said methylene-compound and that in the present process the hydrogen ion concentration has to be adjusted so as to lie between these two limits.

For manufacturing laminated sheets, the base material (paper or fabric) is in the form of sheets or of endless bands impregnated with the solutions of the condensation products, to which, if required, filling materials, coloring substances or pigments may be added. The solution applied to the material in this way is then preferably evaporated also without heating, whereafter a suitable number of such layers, one laid upon the other, are in the usual manner by the action of heat and pressure united and so to say welded together.

The non-filled material is translucent and may be colored or streaked in any shade. The material can be bored, filed, milled, polished and in the warm state also easily stamped. Its mechanical strength is very great, various objects, articles, pieces and parts exposed to considerable mechanical strain may be made therefrom such as for instance parts of gearings, toothed wheels, highly strained parts of textile and other machines, centrifugal pots for spinning machines etc. Likewise they are adapted for manifold use in electrotechnics (low and high voltage technics, heavy current and communication engineering and particularly in high frequency technics). Owing to the fact that the dielectric power factor of these products depends to a very low degree upon the temperature, they are also particularly suited for the construction of transformers. Moreover as they are insensitive to water, alkalies and acids, these nice looking pressed materials can be used to a large extent for the manufacture of many articles of daily use, furniture etc. and finally also for building purposes. Thus for instance a substitute for veneers of hitherto unequalled chemical properties may be made therefrom, which for itself or in combination with other materials (such as iron) may be used for manufacturing furniture and is also most appropriate as a cover for walls.

A special advantage of these products consists in that the structure of the paper or the tissue (other than asbestos) disappears nearly completely, so that, in contradistinction to the laminated sheets made by means of phenol-formaldehyde condensation products, the masses have in all directions the same structure and are therefore more resistant in chemical as well as in mechanical respect. The products are for instance not liable to splitting and for this reason can be used for more purposes and to a greater extent than the hitherto known materials.

Examples (1) 76 kilograms (1 mol.) of thiourea are in a finely powdered state under agitation dissolved in 300 kilograms of an aqueous formaldehyde solution containing 30 per cent by weight (3 mols) of formaldehyde. Then ½ to 1 kilogram of phosphoric acid and 60 kilograms (1 mol.) of urea are added to this solution. Now paper or fabric of linen or asbestos is in a suitable manner impregnated with this solution and then kept during 24 hours at room temperature, during which time the excess of water dries off. The impregnated single sheets may now be further worked up by any method usually employed in the manufacture of laminated sheets from phenol-formaldehyde condensation products. For producing plates or blocks the sheets, a suitable number of which is superposed one upon the other, are at a temperature of 120° to 140° C. pressed together, whereby the binding agent first of all turns into a flowing state and then unites the whole to a uniform mass. The time required for curing is considerably shorter than can be attained with fabrics impregnated with the usual phenol-formaldehyde condensation products. For manufacturing tubes or other hollow bodies of any cross-section the winding methods and machines as employed in manufacturing pheno-plastics are used.

(2) By disintegration of the laminated sheets made according to Example 1 to particles of a size of about 1 centimeter and hot pressing the disintegrated mass under high pressure molded pieces of particularly high mechanical strength can be made. For this mode of carrying out the process especially laminated linen sheets are most appropriate.

The process may also be carried out by causing preliminarily prepared monomethylol urea or dimethylol urea (or mixtures of these compounds) to take part in the condensation of thiourea and formaldehyde under the above specified conditions. The proportion of formaldehyde has in such case of course to be diminished for the amount belonging to the urea portion.

What I claim is:—

1. The process of making tough, hard and dense sheets which comprises impregnating a cellulosic lamina with a solution prepared by mixing 1 mol. of thiourea and less than 2 mols formaldehyde without addition of external heat in an aqueous medium which is more acid than $C_H=10^{-5}$ and less acid than about $C_H=10^{-3}$, drying the impregnated lamina without heating the same, and subjecting the same thereafter to pressure and heat sufficient to form a hydrophobe resinous product therein.

2. The process of making tough, hard and dense sheets which comprises impregnating a cellulosic lamina with a solution prepared by mixing 1 mol. of a mixture of thiourea and urea with less than 2 mols of formaldehyde in an aqueous medium which is more acid than $C_H=10^{-5}$ and less acid than about $C_H=10^{-3}$, the mixing and impregnation being accomplished without addition of external heat and the amount of thiourea in the mixture being sufficient to prevent the formation of white insoluble formaldehyde-urea products, drying the impregnated lamina without heating the same, and thereafter subjecting the same to pressure and heat sufficient to effect the formation of a hydrophobe resinous compound therein.

3. The process of making tough, hard and dense sheets which comprises impregnating a cellulosic lamina with a solution prepared by mixing 1 mol. of a mixture of thiourea and urea with less than 2 mols of formaldehyde in an aqueous medium having a hydrogen-ion concentration of about $C_H = 10^{-3}$, the mixing and impregnation being accomplished without addition of external heat and the amount of thiourea in the mixture being sufficient to prevent the formation of white insoluble formaldehyde-urea products, drying the impregnated cellulosic lamina without heating the same, and thereafter subjecting the same to pressure and heat sufficient to effect the formation of a hydrophobe resinous compound therein.

4. A tough hard dense sheet substantially identical with that produced by the process set forth in claim 1.

5. A tough hard dense sheet substantially identical with that produced by the process set forth in claim 2.

6. A tough hard dense sheet substantially identical with that produced by the process set forth in claim 3.

KURT RIPPER.